(12) United States Patent
Hall

(10) Patent No.: US 6,840,160 B2
(45) Date of Patent: Jan. 11, 2005

(54) COOKING APPARATUS

(75) Inventor: Kenneth Michael Hall, Wynberg (ZA)

(73) Assignee: Cobb International Limited (ZA)

(*) Notice: Subject to any disclaimer, the term of this patent is extended or adjusted under 35 U.S.C. 154(b) by 0 days.

(21) Appl. No.: 10/473,291

(22) PCT Filed: Mar. 26, 2002

(86) PCT No.: PCT/ZA02/00050
§ 371 (c)(1),
(2), (4) Date: Sep. 24, 2003

(87) PCT Pub. No.: WO02/076272
PCT Pub. Date: Oct. 3, 2002

(65) Prior Publication Data
US 2004/0107842 A1 Jun. 10, 2004

(30) Foreign Application Priority Data
Mar. 26, 2001 (ZA) .......................................... 2001/2447

(51) Int. Cl.⁷ .............................. A23L 1/00; A47J 37/00
(52) U.S. Cl. .............................. 99/339; 99/340; 99/446; 99/447; 99/450; 99/482; 129/9 R; 129/25 R
(58) Field of Search .......................... 99/330, 331, 339, 99/340, 341, 342, 400, 401, 444–450, 481, 482, 483, 403–417, 467, 476; 126/275 R, 25 R, 9 R, 41 R; 219/400, 401

(56) References Cited

U.S. PATENT DOCUMENTS

| 1,608,223 | A  |   | 11/1926 | Magoon |        |
|-----------|----|---|---------|--------|--------|
| 6,089,145 | A  | * | 7/2000  | Watson | 99/339 |
| 6,213,006 | B1 | * | 4/2001  | Reardon et al. | 99/446 |
| 6,220,149 | B1 | * | 4/2001  | Lin    | 99/339 |
| 6,389,961 | B1 | * | 5/2002  | Wu     | 99/339 |

FOREIGN PATENT DOCUMENTS

| EP | 0419144 A  | 3/1991 |
| JP | 61008017 A | 1/1986 |
| JP | 09023970 A | 1/1997 |

* cited by examiner

Primary Examiner—Timothy F. Simone
(74) Attorney, Agent, or Firm—Morgan, Lewis & Bockius LLP

(57) ABSTRACT

The invention provides cooking apparatus (10) comprising a base unit (12) having an inner shell (40) which defines an interior compartment (51), a combustion chamber (14) for holding combustion material; and insulating means (16) including a first annular air channel (18), at least partially surrounding the interior compartment (51).

12 Claims, 7 Drawing Sheets

COOKING APPARATUS

FIELD OF THE INVENTION

This invention relates to cooking apparatus and more particularly, but not exclusively, to improvements relating to the insulation of cooking apparatus.

BACKGROUND TO THE INVENTION

At present, dome-shaped or kettle-type cooking apparatus is well known. Such apparatus has a metal base and dome shaped lid, and burns charcoal briquettes to supply the heat required for cooking. In use, the metal dome and especially the metal base nearest the heat source heats up, resulting in reduced efficiency and reduced portability of the apparatus.

An attempt was made to address these problems with a number of developments. In this regard, attention is specifically drawn to patents WO 00/02474, as well as U.S. Pat. Nos. 5,406,930, 5,588,420 and 5,197,379. Previous attempts at insulating the base of the cooking apparatus have utilised insulating material such as fibreglass wool. This method of insulation has a number of disadvantages, the first being that the insulating material increases the overall weight of the cooking apparatus, reducing portability. A second disadvantage is that these insulating materials tend to degrade over time, and may disperse into the air, contaminating the food being cooked. A third disadvantage of these insulating materials is that when they get wet, possibly through standing outside in the rain, their insulating properties vary and their weight increases significantly.

Another method of insulation is the creation of "dead air" spaces in which air or insulating material has been trapped in enclosures in which the airflow has been restricted. This method of insulation has a number of disadvantages. A first disadvantage is that it effectively requires more material to construct. Secondly, it is more complex and therefore more costly to produce. Finally, this method of insulation results in intense heat build-up in the enclosures, dictating the use of heavy materials such as metal for the construction of the apparatus, increasing the weight of the cooking apparatus and further reducing it's portability.

OBJECT OF THE INVENTION

An object of the invention is to provide improvements relating to cooking apparatus that at least partially alleviate some of the abovementioned problems.

SUMMARY OF THE INVENTION

According to the invention cooking apparatus is provided comprising a base unit having an inner shell which defines an interior compartment, a combustion chamber within the interior compartment for holding combustion material; and insulating means including a first annular air channel, at least partially surrounding the interior compartment.

Further according to the invention the first annular air channel is formed by a pair of spaced circumferential skirts, at least partially surrounding the interior compartment.

Still further according to the invention a low level inlet and a high level outlet, respectively to and from the first annular air channel, are provided, to permit a flow of cool air through the first annular air channel.

The cooking apparatus including a second annular air channel disposed between the first annular air channel and the interior side walls of the base unit.

The cooking apparatus wherein the second annular air channel communicates with the low level inlet and the high level outlet to permit a flow of cool air through the second annular channel.

Further, the base unit includes an outer shell spaced from an outer circumferential skirt and a first annular air channel to create a space of dead air.

Still further, an annular moat is provided, the moat surrounding the combustion chamber and defining a lower cooking zone. Additionally, the moat acts as a catchment area for liquids descending from an upper cooking zone.

According to a further feature of the invention the moat is formed at the base of an inner shell structure, the inner shell structure being disposed adjacent the second annular air channel. The inner shell structure is removable from the base unit. Preferably, resilient lug members are disposed at an upper rim of the base unit to space the inner shell structure from the inner circumferential skirt. Thus with such an arrangement the second annular air channel is formed radially inwardly from the first annular air channel, preferably concentrically therewith, the second air channel being formed between the inner circumferential skirt and the inner shell structure. Further according to the invention the combustion chamber is receivable generally concentrically within the inner shell.

The invention further provides for the combustion chamber to include a base and a heat shield spaced from the base. Such a heat shield preferably also acts as an ash collecting tray. The combustion chamber may further include an upwardly projecting stand for supporting a pot or the like in a position spaced from combustion material in the combustion chamber.

According to a further feature of the invention the upper cooking zone is formed by a grid-like support or the like. Troughs are provided on the upper cooking zone for directing liquids emanating from the cooking process towards draining apertures.

In one embodiment of the invention the upper cooking zone has an unperforated area superimposed above the combustion chamber to prevent liquids emanating from the cooking process from draining onto the combustion chamber.

Still further according to the invention a dome structure is provided for enclosing the upper cooking zone, the dome defining apertures for venting gases emanating from the cooking process.

Preferably, the dome is supported on the upper cooking zone so as not to enclose the high level outlet.

BRIEF DESCRIPTION OF THE DRAWINGS

One embodiment of the invention is described below, by way of example only, and with reference to the accompanying drawing in which.

DETAILED DESCRIPTION OF THE DRAWINGS

Figure 1:
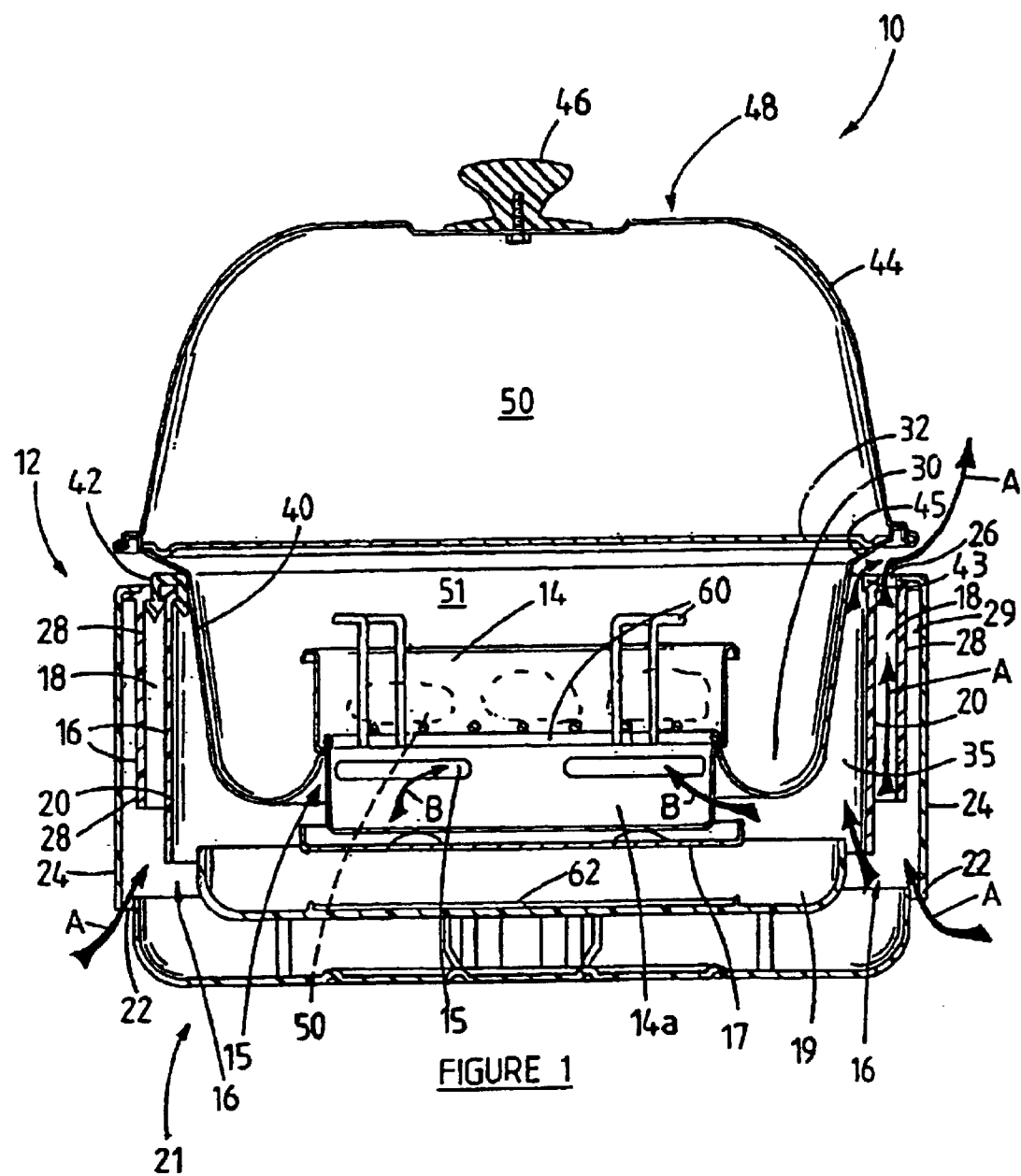
FIG. 1 is a side cross-sectional view of the cooking apparatus according to the invention.

With reference to the drawings in which like features are indicated by like numerals, cooking apparatus is generally indicated by reference numeral 10.

Figure 5:
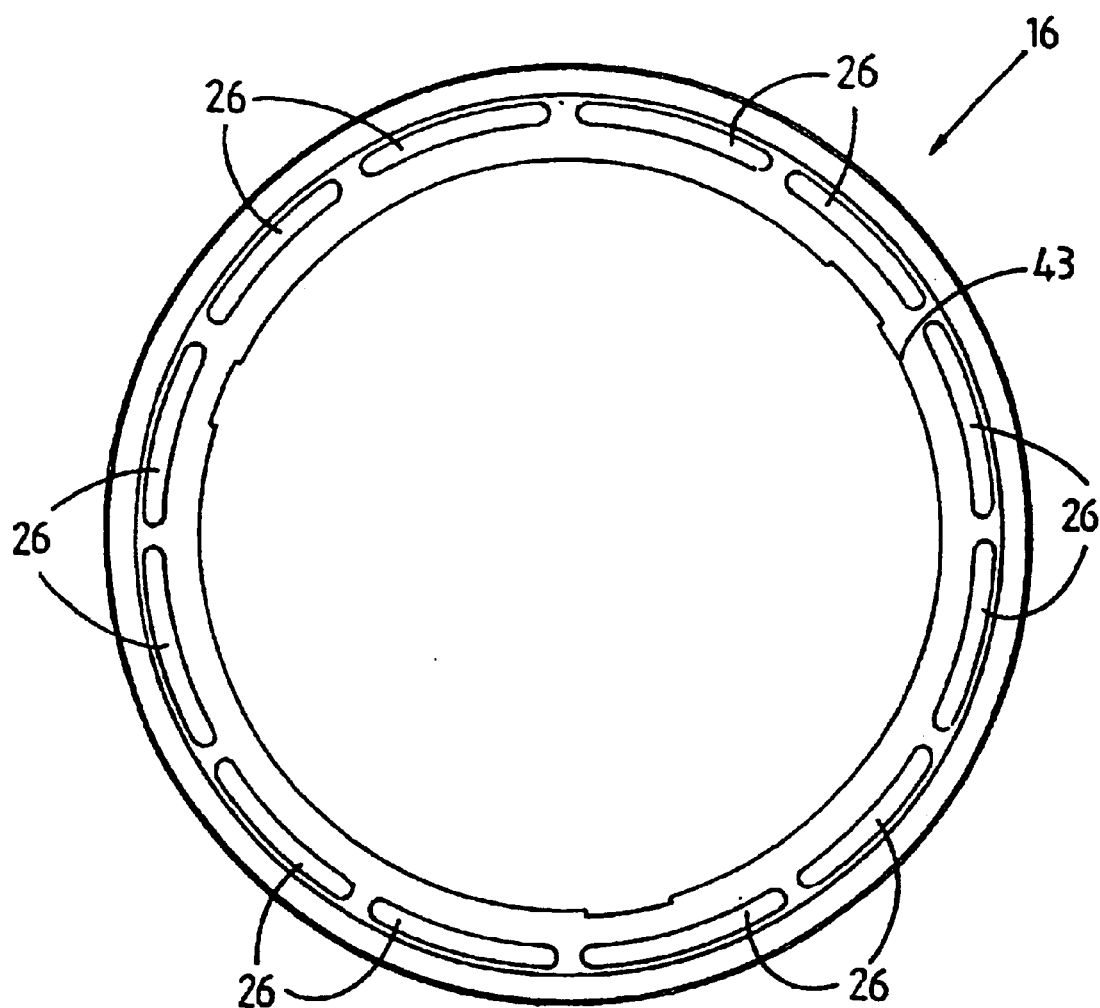
FIG. 5 is a plan view of the insulation means of the cooking apparatus of FIG. 1.
Figure 6:
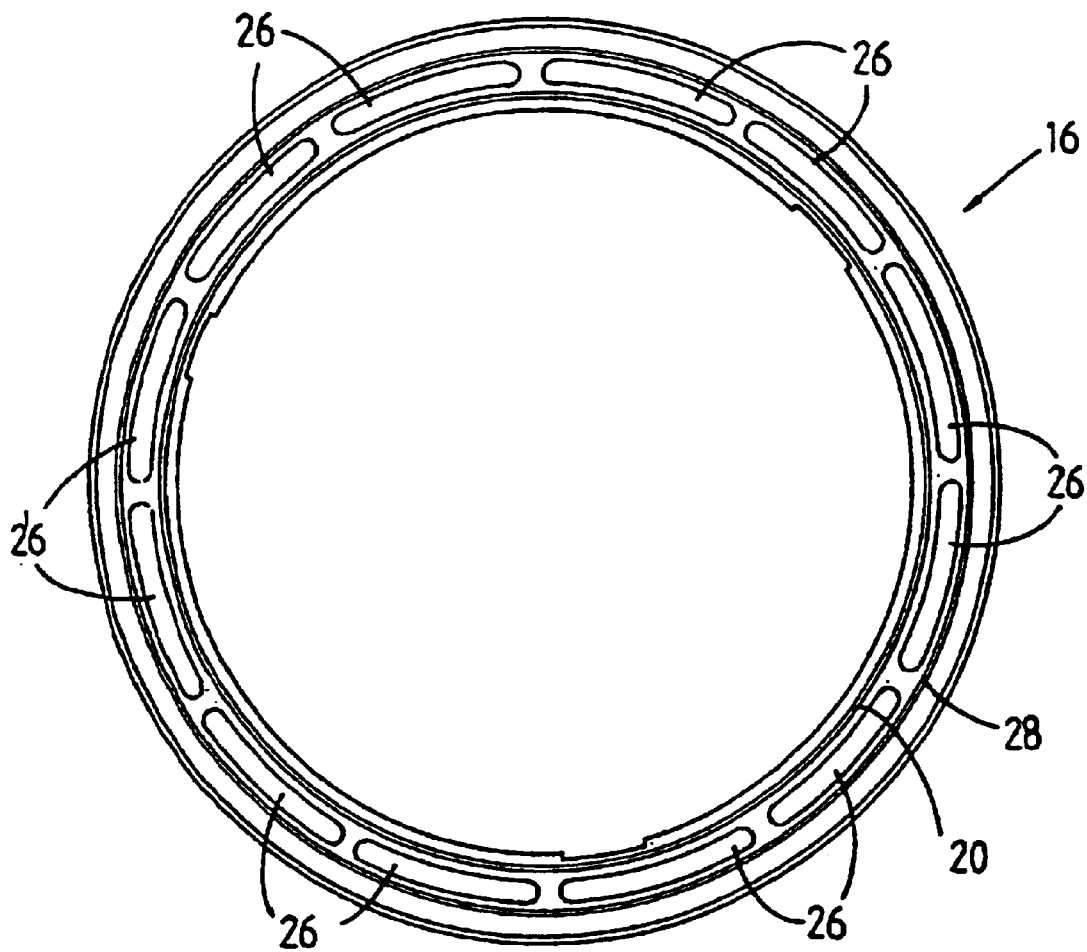
FIG. 6 is a bottom view of the insulating means of FIG. 7.

The cooking apparatus comprises a base unit 12 having an interior shell 40 which defines an interior compartment 51 which houses a combustion chamber 14 for holding combustion material; and insulating means 16 (shown in FIGS. 5 and 6) for insulating the interior shell 40.

Figure 8:
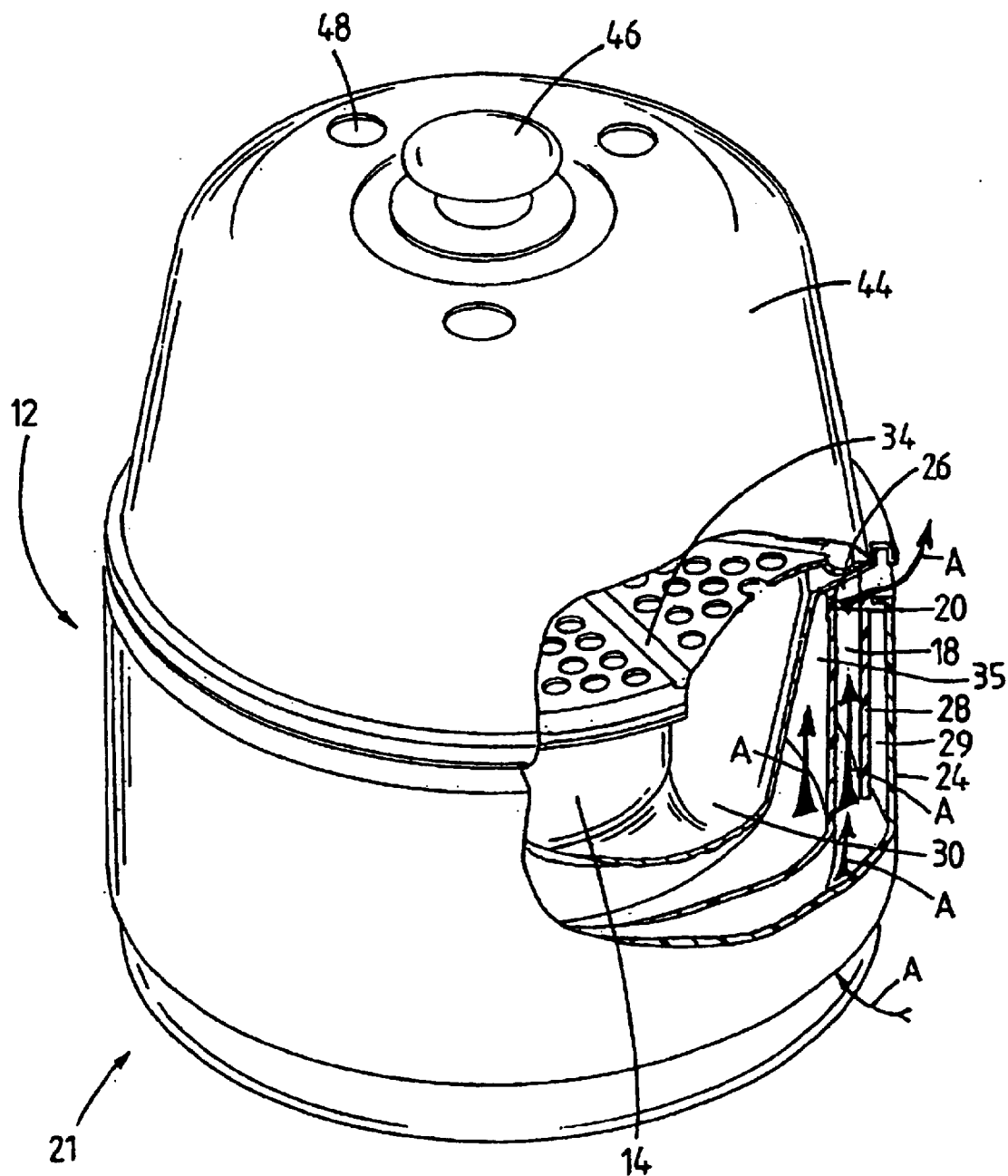
FIG. 8 is a cut-away perspective view of the cooking apparatus of FIG. 1.

The insulating means 16 defines a first annular air channel 18 formed by an inner circumferential skirt 20 and an outer circumferential skirt 28 surrounding the combustion chamber 14. A low level inlet 22 is provided in an outer shell 24 of the cooking apparatus 10 and a high level outlet is defined at 26. The inlet 22 and outlet 26 respectively to and from the first annular air channel 18, permits a flow of cool air (shown in FIGS. 1 and 8 by the arrows marked A) upwardly through the first annular air channel 18.

A second annular air channel 35 is formed between the inner circumferential skirt 20 and the interior shell structure 40 of the base unit 12. The second annular air channel 35 is thus disposed radially inwardly from the first annular air channel 18 and concentrically therewith. Cooling air entering the inlet 22 also flows upwardly through the second annular air channel 35 to the outlet 26.

The base unit 12 further includes an outer shell 24 made from a material having low heat conductivity such as polymer material. The outer shell 24 is outwardly spaced from the outer skirt 28 of the first air channel 18 and together therewith defines a dead air space 29. The combined insulating properties of the first and second annular air channels 18, 35 and the dead air space 29 enable the cooking apparatus 10 to be carried by a user without the use of any protective gear.

Figure 2:
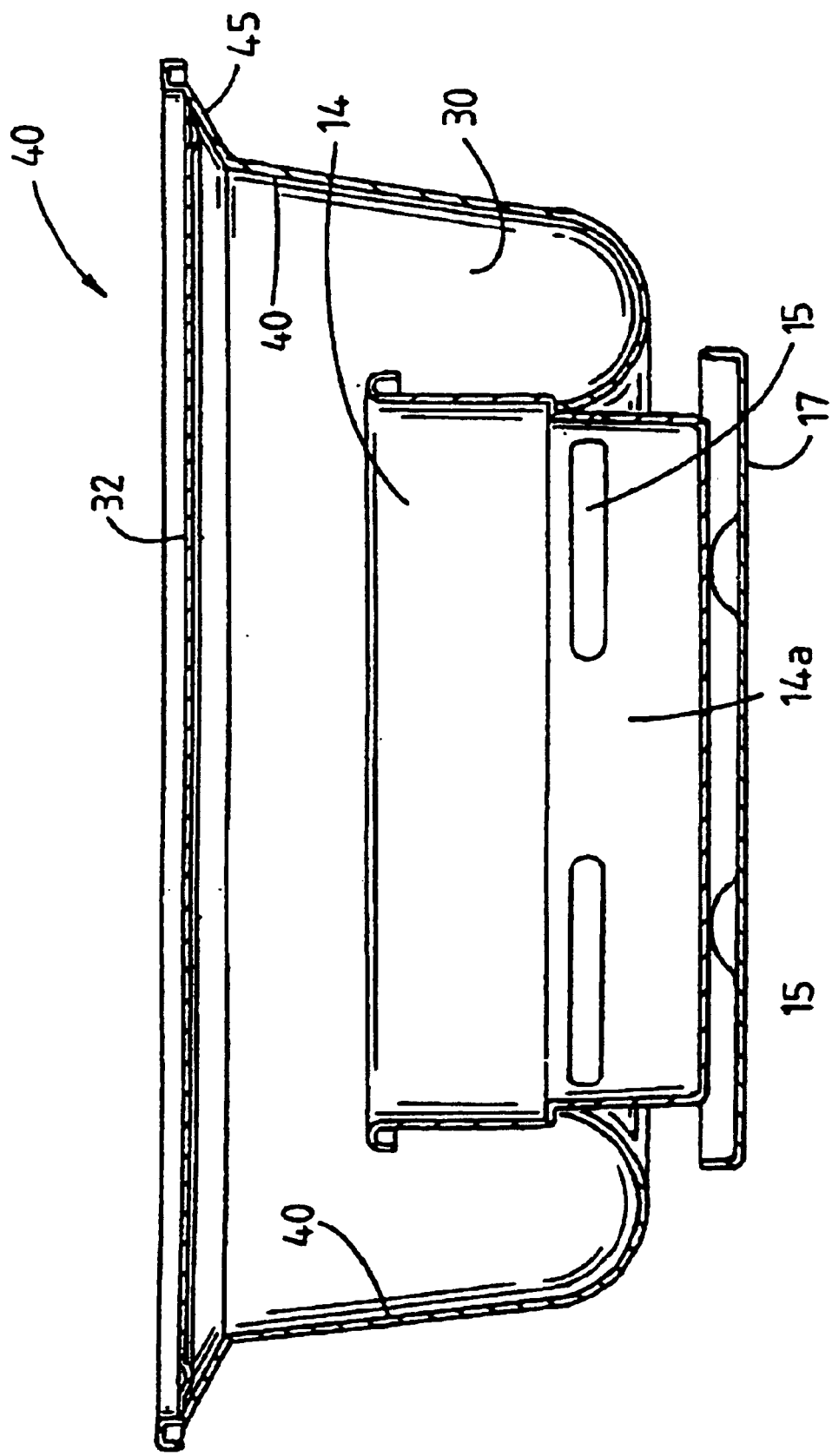
FIG. 2 is a side cross-sectional view of the inner shell of the cooking apparatus of FIG. 1.

An annular moat 30 is formed around the combustion chamber 14. The moat 30 is formed at the base of the inner shell structure 40 (shown in FIG. 2) and the combustion chamber 14 is received generally concentrically within the inner shell 40. The moat 30 constitutes a lower cooking zone and is also adapted to receive liquids emanating from a cooking process in an upper cooking zone described below.

The inner shell 40 is disposed adjacent the second air channel 35 and is removable from the base unit 12. Resilient lug members 42 are located at an upper rim 43 of the insulating means 16 to space the inner shell 40 from the inner circumferential skirt 20.

An upper cooking zone 50 is provided above a perforated plate 32 which rests on the base unit 12. The perforated plate 32 is supported on a lip 45 of the inner shell 40. As stated above, the moat 30 acts as a catchment area for liquids descending from the perforated plate 32.

Figure 3:
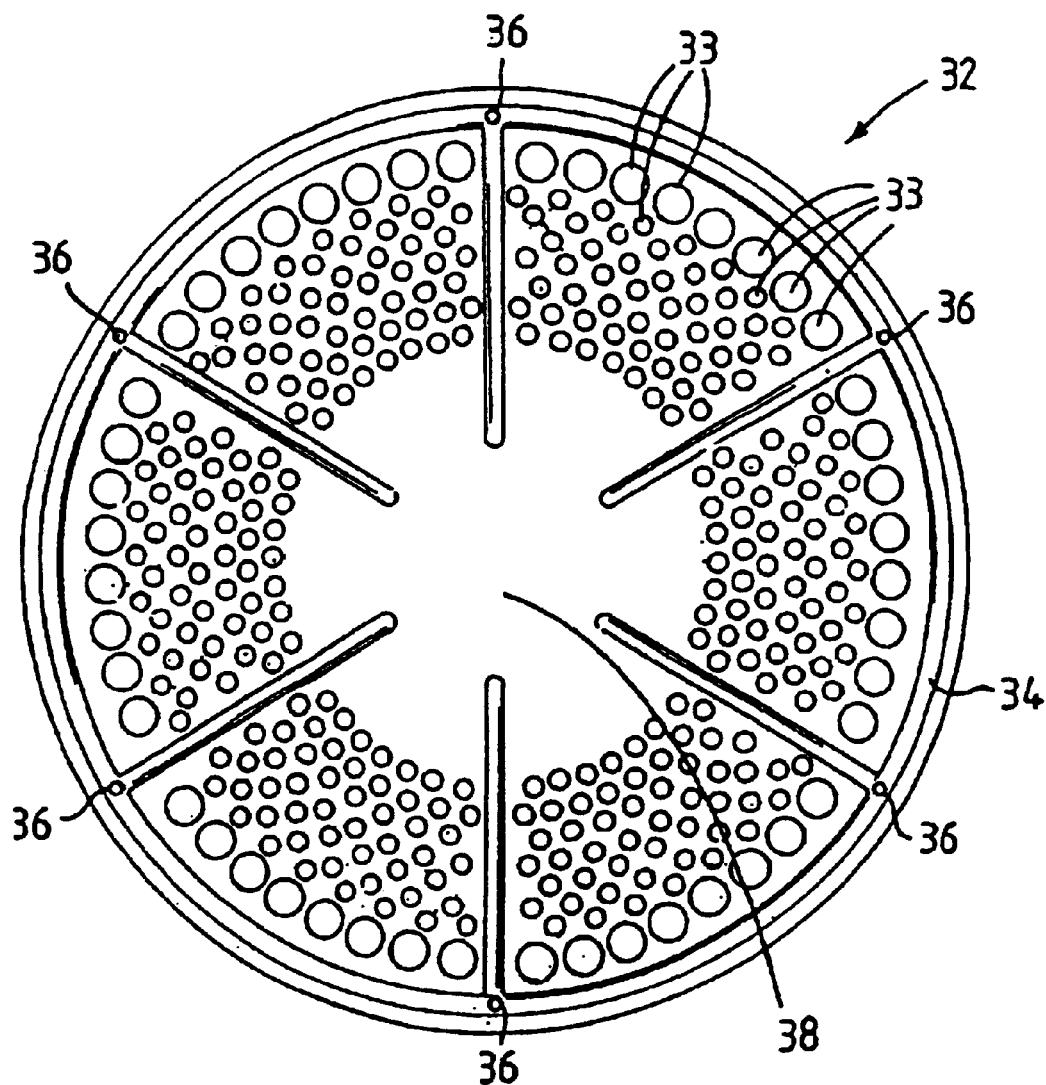
FIG. 3 is a plan view of the upper cooking zone of the cooking apparatus of FIG. 1.
Figure 4:
FIG. 4 is a side view of the upper cooking zone of FIG. 3.

Troughs 34 are provided on the perforated plate 32 (shown in FIGS. 3 and 4) for directing liquids emanating from the cooking process towards draining apertures 36 which overlie the lip 45.

The combustion chamber 14 includes a base 14a and a heat shield 17 spaced from the base 14a. Apertures 15 are provided around the circumference of the base 14a to enable ash to filter onto the heat shield 17 below and to admit combustion air into the chamber 14. The inner shell 40 can be removed from the base unit 12 to empty ash from the heat shield 17.

The combustion chamber 14 further includes an upwardly projecting stand 60 for supporting a pot or the like in a position spaced from combustion material 50 in the combustion chamber 14.

The perforated plate 32 further has an unperforated area 38 superimposed above the combustion chamber 14 to prevent liquids emanating from the cooking process from drain into the combustion chamber 14. Further, the perforated plate 32 has larger perforations 33 located around its outer peripheral area thereof than its inner peripheral area (shown in FIG. 3), thus reducing the airflow inwardly of the circumference of the perforated plate 32 and reducing the likelihood that the combustion material 50 will produce flames.

A dome structure 44 having a handle 46 is provided for enclosing the perforated plate 32 and upper cooking zone 50. The dome 44 defines apertures 48 for venting gases emanating from the cooking process. The dome has a reflective inner surface (not shown) for limiting heat generated inside the cooking apparatus from being lost to the exterior thereof.

The dome 44 is supported on the perforated plate 32 so as not to enclose the high level outlets 26.

Figure 7:
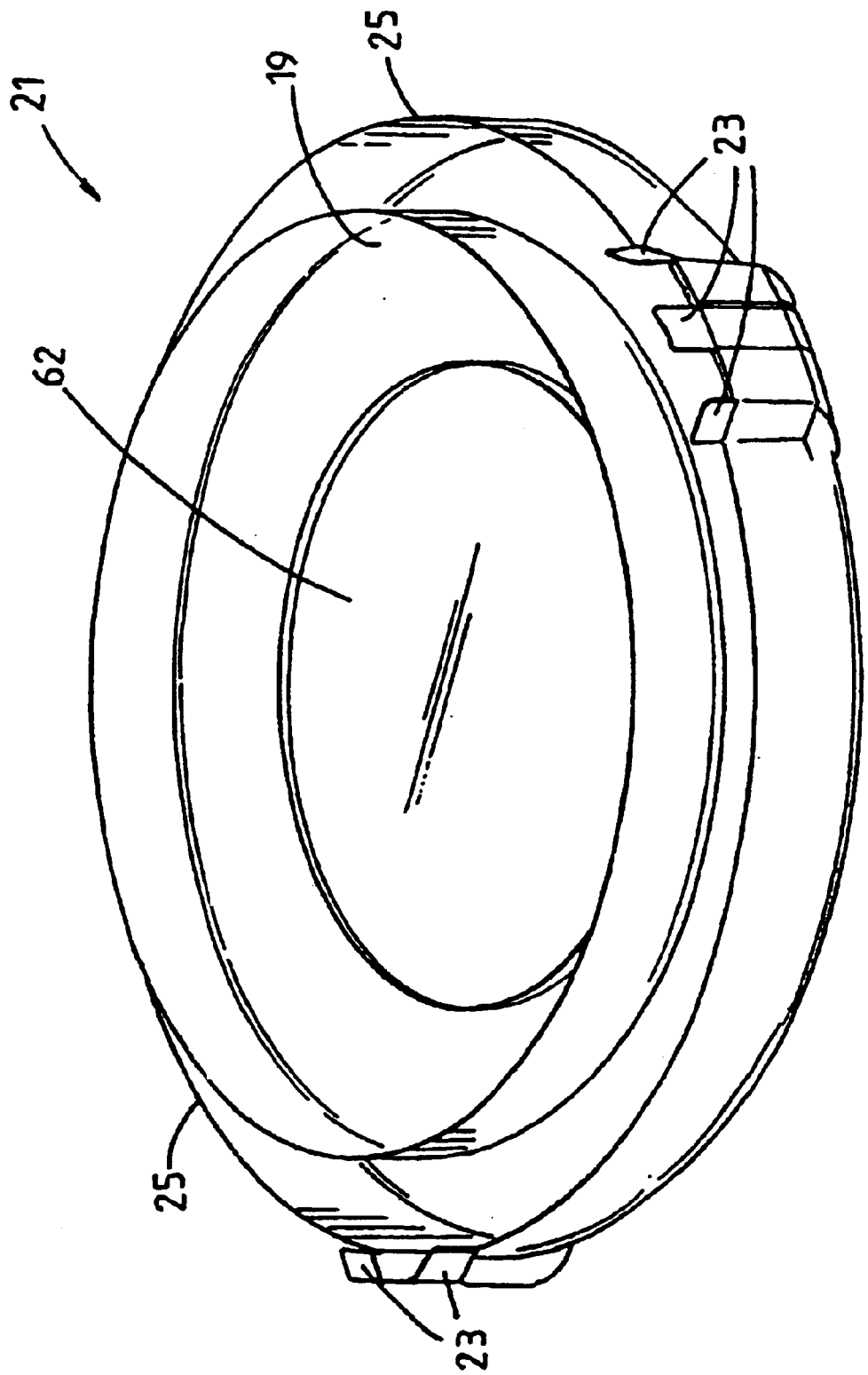
FIG. 7 is a perspective view of the lower portion of the base unit shown in FIG. 1.

The exterior shell 24 (shown in FIG. 8) of the base unit 12 is pop-riveted to a lower portion 21 through flanges 23 located on an upper rim 25 of the lower portion 21 (shown in FIG. 7). The lower portion 21 has a heat resistant plate 62 to insulate the heat radiating from the base 14a of the combustion chamber 14 from the outer shell 24.

In use the cooking apparatus of the invention operates as follows:

(i) The dome 44 and perforated plate 32 are removed from the cooking apparatus 10 to provide access to the combustion chamber 14. A cooking fire may be ignited in the combustion chamber 14 using conventional combustion material 50, such as charcoal briquettes.

(ii) Air enters the low level inlet 22, from where it flows through the first and second annular air channels 18, 35 in the insulating means 16 (airflow shown by the arrows marked A), and through the apertures 15 in the combustion chamber 14 (airflow shown by the arrows marked B) where it is utilized in the combustion process. Furthermore, the air entering at the low level inlet 22 becomes trapped in the dead air space 29 which forms a further insulating barrier.

(iii) Coals are formed from the combustion material and sufficient heat is generated for cooking. Flavourants, foods or liquids, such as a marinade, wine, vegetables or herbs, may be placed in the lower cooking zone defined by the moat 30.

(iv) The perforated plate 32 is supported on the lip 45 of the moat 30 and food is arranged thereon. The liquids emanating from the cooking food are drained from the perforated plate 32 by the troughs 34, which direct the liquid to drainage holes 36. This liquid drains into the moat 30 below.

(v) The cooking process may be enhanced by the heat reflected from the inner surface of the dome 44, once the dome is applied.

It is envisaged that the cooking apparatus will be useful in circumstances where portability is required, such as when weather conditions require moving the cooking apparatus indoors. The efficient and relatively clean combustion also enables the cooking apparatus to be used in indoor areas. A further advantage is that the cooking apparatus has a relatively cool outer surface that decreases the likelihood of surrounding objects being ignited or damaged. For this reason the cooking apparatus may also be used safely in the presence of small children. The cooking apparatus may be placed on an eating table as a food warmer. A further advantage is that the cooking process is less affected by wind conditions as the airflow through the cooking apparatus is regulated.

It will be appreciated that the invention is not limited to the precise details as described. For example, the perforated surface 32 may consist of a wire grille or grid; not shown, the cooking apparatus may be various shapes such as cube shaped or pyramidal shaped; not shown, and the number and spacing of the circumferential skirts 20, 28, may also vary.

What is claimed is:

1. Cooking apparatus comprising a base unit having an inner shell which defines an interior compartment, a combustion chamber for holding combustion material; insulating means including a first annular air channel, at least partially surrounding the interior compartment; a low level inlet and a high level outlet respectively to and from the first annular air channel to permit a flow of cooling air through the first annular air channel; and a second annular air channel disposed between the first annular air channel and the inner shell of the base unit, wherein the second annular air channel communicates with the low level inlet and the high level outlet to permit a flow of cooling air through the second annular channel.

2. Cooking apparatus comprising a base unit having an inner shell which defines an interior compartment, a combustion chamber for holding combustion material; and insulating means including a first annular air channel, at least partially surrounding the interior compartment;
   wherein the first annular air channel is formed by an inner circumferential skirt and an outer circumferential skirt radially spaced from one another; and
   wherein the base unit includes an outer shell spaced from the outer circumferential skirt of the first annular air channel to create a space of dead air.

3. Cooking apparatus comprising a base unit having an inner shell which defines an interior compartment, a combustion chamber for holding combustion material; insulating means including a first annular air channel, at least partially surrounding the interior compartment; and an annular moat which surrounds the combustion chamber and which defines a lower cooking zone.

4. The cooking apparatus according to claim 3 wherein the moat is positioned to act as a catchment area for liquids descending from an upper cooking zone.

5. The cooking apparatus according to claim 3 wherein the moat is defined at the base zone of the inner shell of the base unit.

6. Cooking apparatus comprising a base unit having an inner shell which defines an interior compartment, a combustion chamber for holding combustion material; and insulating means including a first annular air channel, at least partially surrounding the interior compartment, wherein the inner shell is removable from the base unit.

7. Cooking apparatus comprising a base unit having an inner shell which defines an interior compartment, a combustion chamber for holding combustion material; insulating means including a first annular air channel, at least partially surrounding the interior compartment, including a low level inlet and a high level outlet respectively to and from the first annular air channel to permit a flow of cooling air through the first annular air channel;
   wherein resilient lug members are provided and disposed at an upper rim of the base unit to space the inner shell from an inner circumferential skirt of the first annular air channel.

8. Cooking apparatus comprising a base unit having an inner shell which defines an interior compartment, a combustion chamber for holding combustion material; and insulating means including a first annular air channel, at least partially surrounding the interior compartment;
   wherein the combustion chamber includes a base and a heat shield disposed below the base spaced therefrom.

9. Cooking apparatus comprising a base unit having an inner shell which defines an interior compartment, a combustion chamber for holding combustion material; and insulating means including a first annular air channel, at least partially surrounding the interior compartment;
   wherein the combustion chamber includes an upwardly projecting support stand for supporting a pot or the like in a position spaced from combustion material in the combustion chamber.

10. Cooking apparatus comprising a base unit having an inner shell which defines an interior compartment, a combustion chamber for holding combustion material; insulating means including a first annular air channel, at least partially surrounding the interior compartment; and
    an upper cooking zone in the form of a grid-like support which is perforated to drain liquids emanating from a cooking process towards an underlying moat which surrounds the combustion chamber, the central zone of the grid-like support being non-perforated to shield the combustion chamber from such liquid.

11. Cooking apparatus according to claim 10 including a dome structure for enclosing the upper cooking zone, the dome defining apertures for venting gasses emanating from the cooking process.

12. Cooking apparatus according to claim 11 wherein the dome is supported on the upper cooking zone and the outer periphery of the dome is inwardly spaced from high level air outlets defined by the base structure.

* * * * *